(12) United States Patent
Bar-on et al.

(10) Patent No.: US 11,030,555 B2
(45) Date of Patent: Jun. 8, 2021

(54) ISSUE TRACKING SYSTEM USING A SIMILARITY SCORE TO SUGGEST AND CREATE DUPLICATE ISSUE REQUESTS ACROSS MULTIPLE PROJECTS

(71) Applicants: Atlassian Pty. Ltd., Sydney (AU); Atlassian Inc., San Francisco, CA (US)

(72) Inventors: Noam Bar-on, San Francisco, CA (US); Sukho Chung, San Francisco, CA (US)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 0 days.

(21) Appl. No.: 16/370,442

(22) Filed: Mar. 29, 2019

(65) Prior Publication Data

US 2020/0210934 A1 Jul. 2, 2020

Related U.S. Application Data

(60) Provisional application No. 62/786,093, filed on Dec. 28, 2018.

(51) Int. Cl.
*G06Q 10/06* (2012.01)
*G06F 8/20* (2018.01)

(52) U.S. Cl.
CPC ....... *G06Q 10/063114* (2013.01); *G06F 8/20* (2013.01)

(58) Field of Classification Search
USPC ....................................................... 717/103
See application file for complete search history.

(56) References Cited

U.S. PATENT DOCUMENTS

| | | | |
|---|---|---|---|
| 9,135,146 B1* | 9/2015 | Allen | G06F 11/0706 |
| 9,430,359 B1* | 8/2016 | Troutman | G06F 11/0706 |
| 10,565,234 B1* | 2/2020 | Sims | G06F 16/285 |
| 2011/0243381 A1* | 10/2011 | Tsagkatakis | G06K 9/66 |
| | | | 382/103 |
| 2011/0321007 A1* | 12/2011 | Marum | G06F 8/65 |
| | | | 717/113 |
| 2015/0199626 A1* | 7/2015 | Guthrie | G06Q 10/20 |
| | | | 705/7.12 |
| 2017/0053289 A1* | 2/2017 | Wang | G05B 23/0278 |
| 2018/0315055 A1* | 11/2018 | Pickover | G06Q 30/016 |

(Continued)

OTHER PUBLICATIONS

Wang et al., "Linking Issue Tracker with Q&A Sites for Knowledge Sharing across Communities," IEEE, 2015, 14pg. (Year: 2015).*

*Primary Examiner* — Ryan D. Coyer
(74) *Attorney, Agent, or Firm* — Brownstein Hyatt Farber Schreck, LLP

(57) ABSTRACT

An issue tracking system for tracking software development tasks is described herein. The issue tracking system may be configured to receive new issue requests from a client device and associate the new issue requests with one or more clusters of previously stored issue records. The issue tracking system may also determine similarity between issues in a first cluster of stored issue records and issues in a second cluster that is associated with a different software development project. Based on a determination that the issue similarity exceeds a threshold, the user may be prompted with one or more recommendations for a subsequent issue request or issue request content.

20 Claims, 9 Drawing Sheets

(56) References Cited

U.S. PATENT DOCUMENTS

2019/0026106 A1* 1/2019 Burton .................. G06N 7/005
2019/0026697 A1* 1/2019 Burton ..................... G06F 8/71
2020/0065074 A1* 2/2020 Duan ................... G06F 16/282

* cited by examiner ns. The host service may receive, from the client application, a first issue request. The host service may also generate a first issue record in response to receiving the first issue request and associate the first issue record with a first issue cluster based on a first similarity between first content of the first issue request and content of one or more issue records associated with the first issue cluster. The host service may also determine a similarity score between the first issue record and one or more second issue records that are associated with a second issue cluster that is distinct from the first issue cluster. A seed issue record may be identified or selected from the one or more second issue records based on a determination that the similarity score of the seed issue record satisfies a similarity threshold. In some embodiments, the host service may transmit a suggested issue request to the client application. The suggested issue request may include issue data extracted from the seed issue record.

ISSUE TRACKING SYSTEM USING A SIMILARITY SCORE TO SUGGEST AND CREATE DUPLICATE ISSUE REQUESTS ACROSS MULTIPLE PROJECTS

CROSS-REFERENCE TO RELATED APPLICATIONS

This application is a nonprovisional of and claims the benefit under 35 U.S.C. § 119(e) of U.S. Provisional Patent Application No. 62/786,093, filed on Dec. 28, 2018, and entitled "An Issue Tracking System Using a Similarity Score to Suggest and Create Duplicate Issue Requests Across Multiple Projects," the contents of which are incorporated by reference as if fully disclosed herein.

TECHNICAL FIELD

Embodiments described herein relate to issue tracking systems and, in particular, to systems and methods for anticipating an issue report in a project tracked by an issue tracking system and, additionally, to systems and methods for providing one or more issue report suggestions to a user of an issue tracking system.

BACKGROUND

An organization or individual can use a system to document and monitor work associated with software, a product, or a project. As described herein, it may be particularly useful to track problems or issues that occur with software or software products. For example, an issue tracking system may be used to flag potential issues that are to be addressed by a team of software developers. Some traditional issue tracking systems require manual entry of each issue and the process of adding, editing, and/or otherwise updating issues tracked in a conventional issue tracking system may be unnecessarily time and resource consuming. The techniques and systems described herein may be used to generate, track, and suggest potential issues for a system user without some of the drawbacks of some traditional systems.

SUMMARY

Embodiments described herein generally relate to a method of operating an issue tracking system, the method including the operations of: determining a similarity score of a first issue request for a first project tracked by the issue tracking system to each of a set of previously received issue requests for a second project tracked by the issue tracking system; selecting a similar issue request from the set of previously received issue requests based on a determination that the similar issue request may be associated with a similarity score that crosses a threshold similarity; sending a signal to a client application in communication with the issue tracking system; and sending the signal with a recommendation to submit a supplemental issue request to the issue tracking system, the supplemental issue request submitted with content of the similar issue request, also referred to as "issue data."

Some example embodiments are directed to a networked issue tracking system for suggesting and tracking issue records using a similarity score. The issue tracking system may include a client device executing a client application and a host service operably coupled to the client application of the client device by a network. The host service may have a processor that is configured to perform a series of opera- In some embodiments, the first issue cluster includes a first set of issue records, and the second issue cluster includes a second set of issue records that is separate and distinct from the first set of issue records. In some cases, the first issue cluster is associated with a first software operating system, and the second issue cluster is associated with a second software operating system that is different from the first software operating system. In some cases, the first issue cluster is associated with a first software development team, and the second issue cluster is associated with a second software development team that is separate and distinct from the first software development team.

In some embodiments, the first content of the first issue request includes a first project description, the content of the one or more issue records includes a project description, and the first similarity is determined by comparing the first project description of the first issue request with the project description of the one or more issue records. In one implementation, the first similarity is determined by comparing one or more fields of the first issue request with one or more fields of the one or more issue records associated with the first issue cluster. In addition, determining the similarity score may include applying a similarity algorithm to the first issue record and the one or more second issue records that are associated with the second issue cluster.

Depending on the implementation, applying the similarity algorithm includes one or more of: determining a cosine distance between the first issue record and the one or more second issue records; determining a Jaccard similarity between the first issue record and the one or more second issue records; determining Euclidean distance between the first issue record and the one or more second issue records; determining a Manhattan distance between the first issue record and the one or more second issue records; and determining a semantic similarity between the first issue record and the one or more second issue records.

In some cases, the one or more issue records associated with the first issue cluster are issue records that have been generated in response to previously received issue requests. The previously received issue requests may share a common categorization or tag.

Some example embodiments are directed to an issue tracking system for tracking completion of software development tasks over time. The issue tracking system may include a host service comprising a processor that is configured to: receive a first issue request for a first project tracked by the issue tracking system, the first issue request received from a client application in communication with the issue tracking system over a network; determine a similarity score between a first content of the first issue request and a content of a second issue record that was previously received for a second project tracked by the issue tracking system; determine that the similarity score exceeds a similarity threshold; and in response to the similarity score exceeds the threshold, transmit a suggested issue request to the client application over the network. The suggested issue request may include a recommendation to submit a third issue request to the issue tracking system. The third issue request may have suggested issue content that is based on data extracted from the second issue record. In some cases, determining the similarity score of the content of the first issue request to the content of the second issue record comprises performing a semantic similarity analysis operation. In some cases, the semantic similarity analysis operation comprises comparing a description of the first issue request to a description of the second issue record.

In some embodiments, the processor is further configured to associate the first issue request with a first cluster based on the content of the first issue request. The second issue record may be associated with a second cluster. The first cluster includes a first set of issue records, and the second cluster includes a second set of issue records that is separate and distinct from the first set of issue records. In some embodiments, the processor is further configured to receive an acceptance of the suggested issue request from the client application. In response to receiving the acceptance, the processor may be configured to modify the similarity threshold.

In some implementations, the similarity score is a first similarity score, and the host service is further configured to determine a second similarity score between the first cluster and the second cluster.

In some cases, the content of the first issue request comprises: an issue title; an issue description that describes a problem to be addressed; a platform description indicating a software platform; and an issue creator.

Some example embodiments are directed to a computer-implemented method of operating an issue tracking system on a host service that is in communication with multiple client devices over a computer network. The computer-implemented method may include: receiving a first issue request from a client device of the multiple client devices; associating a first project with the first issue request by analyzing content of the first issue request; determining a similarity score between first content of the first issue request for the first project tracked by the issue tracking system and stored content for each of a set of previously received issue requests for a second project tracked by the issue tracking system; selecting a seed issue record associated with one or more of the set of previously received issue requests based on a determination that the seed issue record a respective similarity score satisfies a similarity threshold; and sending a signal to a client application on the client device, the signal comprising a recommendation to submit a supplemental issue request to the issue tracking system, the supplemental issue request comprising suggested content extracted from the seed issue record.

In some implementations, determining the respective similarity score between the first issue request and the seed issue record comprises comparing a first issue type of the first issue request to a second issue type of the seed issue record. In some implementations, determining the respective similarity score between the first issue request and the seed issue record comprises performing a document similarity operation between text of the first issue request and the seed issue record.

Some optional embodiments include modifying content of the seed issue record based on content of the first issue request. Modifying content of the seed issue record may be based on content of the first issue request comprises replacing a second tag of the seed issue record with a first tag of the first issue request.

BRIEF DESCRIPTION OF THE DRAWINGS

Reference will now be made to representative embodiments illustrated in the accompanying figures. It should be understood that the following descriptions are not intended to limit this disclosure to one included embodiment, to the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
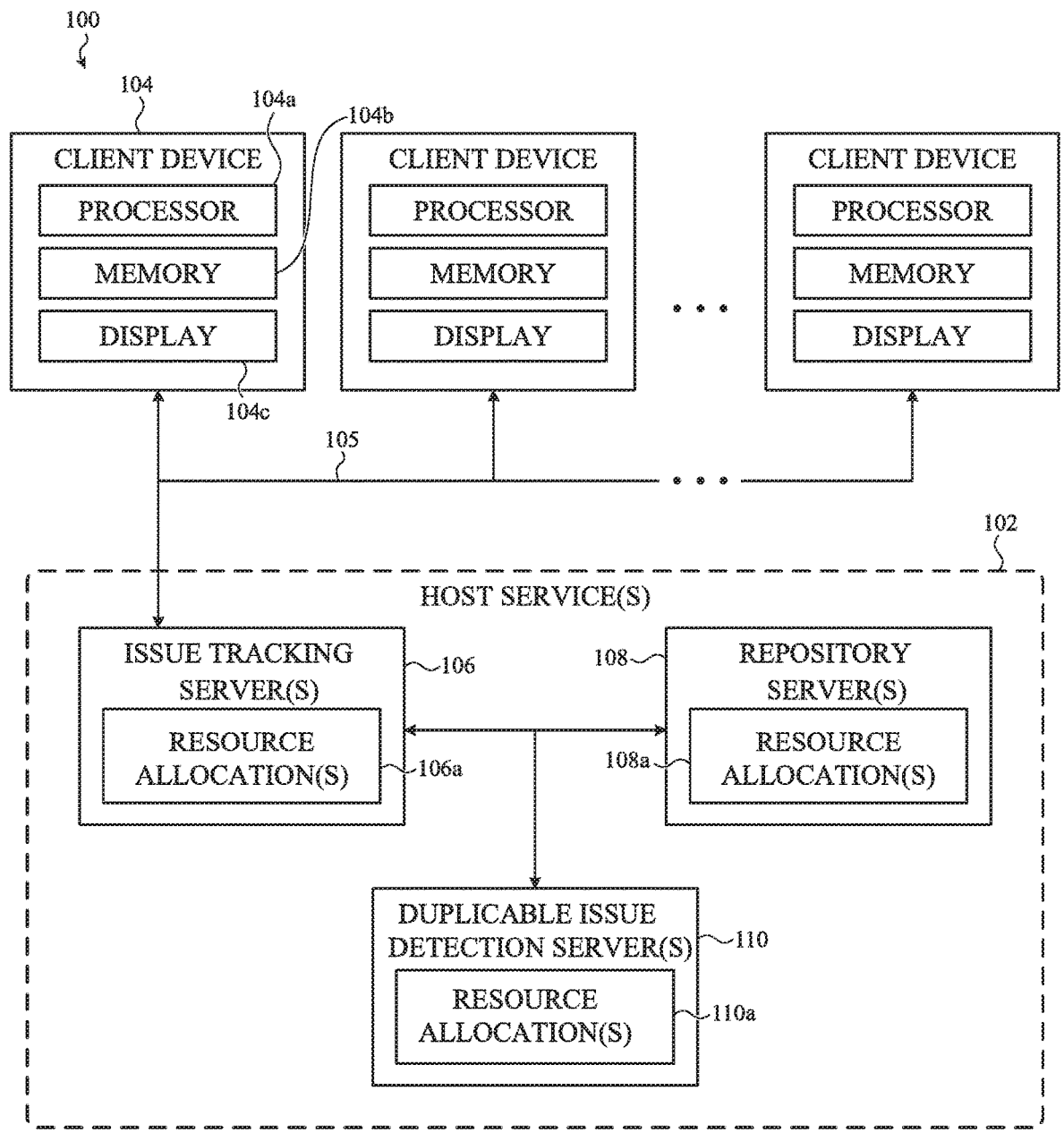
FIG. 1 is a schematic representation of an issue tracking system, such as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein reference systems and methods for suggesting issues or issue requests to a user entering user requests into an issue request system. An issue request system may be a hosted service that is specially configured to monitor and track various tasks and progress of software development tasks that are assigned to a development team or a project group. The embodiments described herein may be particularly useful for suggesting content to issues or issue requests being entered for one project team based on content or issue records that are associated with a second project team. In some cases, the system may be able to associate a newly created record with a cluster associated with a project team or development project. The system may also be able to locate a similar or seed issue record that is associated with a second, distinct cluster and use data or content extracted from the seed issue record to make a recommendation or suggestion to the user. As a result of these and other constructions and architectures described herein, issues can be reported to an issue tracking system in a substantially more time- and resource-efficient manner.

An issue tracking system, as described herein, may be used to refer to a project management tool that may be specially configured for tracking issues and tasks that are associated with a software development project. As described herein, an issue tracking system may be used to refer to a project management tool that can be implemented in whole or in part as software executed by a virtual or physical server or other computing appliance that provides a team of individuals with a means for documenting, tracking, and monitoring completion of work as discrete tasks related to completion, development, or maintenance of a defined project or goal. In many examples, an issue tracking system is configured for use by a software development team to track completion and assignment of discrete tasks related to software development projects from creation of new user stories (i.e., user-perspective feature requests or desired functionality), through proof of concept testing, through integration testing, through release of software to one or more users, and through reporting and fixing of software errors ("bugs"). In other cases, an issue tracking system can be configured for non-software tracking purposes, such as for use by a human resources team, an information technology support group, and so on.

An issue tracking system, as described herein, may increase the efficiency of a team of individuals working on a common goal or project by facilitating the organization of the assignment of discrete items of work to the individual or team of individuals most suited to perform that work. More particularly, each item of work tracked by an issue tracking system is referred to as an "issue" that is typically assigned to a single individual to complete. Example "issues" can relate to, without limitation: a task to identify the cause of a software bug; a task to perform a feasibility assessment for implementation of a new feature; a task to fix an identified software bug; and so on.

As used herein, the term "input" may be used to refer to an action taken by a user of an issue tracking system to affect a state of data or information in that system. In examples described herein, input may be used to refer to data or text entered by a user of a terminal device through a client application or other user interface. Examples of input include, but are not limited to: creating a ticket request; opening an issue or ticket; closing an issue or ticket; modifying data or content of, or associated with, an issue or ticket; adding information, data, or content to an issue or ticket; creating or defining an initiative, theme, epic, user story, or issue group, and the like; and so on.

For simplicity of description, the embodiments that follow reference an "issue report" or, more simply, an "issue" (also referred to as a "ticket") that corresponds to an issue that is being tracked by the system. In some implementations, an "issue report" or "issue" may be used to generally describe both an "issue request" that may be generated by a user and an "issue record" that is generated by the issue tracking system and stored in a database of issue records.

For purposes of the following disclosure, the term "issue request" may be used to describe input to an issue tracking system that may result in the creation of an issue record. As used herein, the term "issue record" may be used to refer to a discrete database record or table row that is associated with an issue being tracked by the issue tracking system and may, in some implementations, be stored at least temporarily in a database of issue records or other form of database storage. While these terms are used herein with respect to specific examples and potential implementations, it may be appreciated that these are merely examples and other embodiments can be configured to receive, anticipate, predict, and/or recommend additional or alternative data, user inputs, or records.

An issue tracking system, as described herein, can be configured to monitor, track, or otherwise analyze issues(s) reported to that system, by one or more users. The issue tracking system may use a history of issue requests and stored issue records to detect, define, determine, or otherwise infer one or more patterns in, and/or logical or causal relationships between, different issues reported to the issue tracking system.

The issues may be related to a particular project and/or a particular grouping or clustering of issues associated with a particular project. As described herein, the issue tracking system may leverage detected patterns and/or logical or causal relationships between different issues and issue reports associated with a particular project or particular group or cluster of issues associated with a particular project to anticipate and/or predict likely issue reports from a user in another project and, additionally, to provide one or more suggestions or recommendations to that user based on the anticipated or predicted issues.

In some embodiments, an issue tracking system may be configured to accept issue requests from multiple users of the system. The issue tracking system may be adapted to analyze incoming issue requests and associate each incoming issue request with a respective cluster or group of existing issue records, which may be associated with a software project team and/or a particular software platform. The issue tracking system may be further adapted to identify one or more seed issue records (also referred to as "issue templates") based on a similarity score computed using the incoming issue request. In some cases, the seed issue record corresponds to a different or distinct cluster or group of records that are associated with a different software project team and/or a different software platform. The seed issue record may be used to generate a suggested issue request that is transmitted back to the user and may be used, in some cases, to automatically generate a new issue request.

As described in more detail below, the issue tracking system identifies a seed or a similar issue record using a similarity score or other analytical tool that is applied to the incoming issue request. A dynamic threshold may be used to determine if the seed or similar record is sufficiently related to the incoming issue request to be relevant. In some cases, the dynamic threshold may be adjusted or modified based on prior user activity including, for example, acceptance of previously suggested issues.

As described in more detail below, a sequence or batch of incoming issue requests may be used to trigger or initiate the identification of a seed or similar issue record. For example, the issue tracking system may monitor a batch or series of incoming issue requests to determine a pattern of issue requests. The issue tracking system may use prior interactions to determine a likelihood that the user may benefit from a suggested issue and, in response, trigger the identification of a seed or similar issue record.

These foregoing and other embodiments are discussed below with reference to FIGS. 1-8. However, those skilled in the art will readily appreciate that the detailed description given herein with respect to these figures is for explanatory purposes only and should not be construed as limiting.

FIG. 1 is a schematic representation of an example issue tracking system. In the illustrated embodiment, the issue tracking system 100 is implemented with a client-server architecture including a host service 102 that communicably couples (e.g., via one or more networking or wired or wireless communication protocols) to one or more client devices, one of which is identified as the client device 104. It may be appreciated that other client devices may be configured in a substantially similar manner as the client device 104, although this may not be required of all embodiments and different client devices can be configured differently and/or may transact data or information with, and/or provide input(s) to, the host service 102 in a unique or device-specific manner.

The client device 104 can be any suitable personal or commercial electronic device and may include, without limitation or express requirement, a processor 104a, volatile or non-volatile memory (identified, collectively, as the memory 104b), and a display 104c. Example electronic devices include, but are not limited to: laptop computers; desktop computers; cellular phones; tablet computing devices; and so on. It may be appreciated that a client device 104, such as described herein, can be implemented in any suitable manner.

In many embodiments, the processor 104a of the client device 104 may include one or more physical processors or processing units that, alone or together, can be configured to execute an application (herein referred to as a "client application") stored, at least in part, in the memory 104b. The client application is configured to access and communicate with the host service 102 and to securely transact information or data with, and provide input(s) to, the host service 102 over a network. In some embodiments, the client application may be a browser application configured to access a web page or service hosted by the host service 102 that is accessible to the client device 104 over a private or public network that may, in some embodiments, include the open internet.

In many embodiments, the host service 102 is configured to operate within or as a virtual computing environment that is supported by one or more physical servers including one or more hardware resources such as, but not limited to (or requiring) one or more of: a processor; a memory; non-volatile storage; networking connections; and the like. As used herein, a processor of the host service 102 may refer one or more physical processors or processing units implemented on one or more physical computing system that, alone or together, can be configured to implement the functionality described herein. The host service 102 may be implemented on a single computing system or using a distributed network of computing systems. For simplicity of description and illustration, the various hardware configurations associated with a processor, computing device, or hardware architecture are not shown in FIG. 1.

In many embodiments, the host service 102 can include a number of discrete subservices or purpose-configured modules, containers, or virtual machines each configured to perform, coordinate, serve, or otherwise provide one or more services, functions, or operations of the host service 102, such as the operations of detecting patterns in issue reporting, operations of determining similarity between issues or categories of issues, and/or operations of determining whether one or more suggestions of issues to report can or should be made to a user of the issue tracking system 100.

Generally, the issue tracking system 100 can be configured to analyze issues in a particular project assigned a particular tag, cluster, group, or categorization for one or more patterns (collectively, herein, "categories" or "categorization"). Additionally, the issue tracking system 100 can be configured to track issues reported in other projects having similar or identical tags, groups, or categorizations (e.g., different groups having a similarity score exceeding a threshold). Upon recognizing a pattern of issue reporting in the first project (e.g., a first issue report typically precedes a second and third issue report, each having a particular categorization or tag), the issue tracking system 100 can provide suggestions for issue reporting to a user of a second project that reports an issue in the second project in a manner that matches or corresponds to the previously-detected pattern.

In some embodiments, the host service 102 is configured to receive issue requests from the client device 104 via the network 105. As incoming issue requests are received, the issue tracking server 106 may perform analysis on the issue request and associate the request with a particular cluster or group, which may correspond to a particular software module and/or project group. As described herein, host service 102 may create an issue record that is stored in one or more repository servers 108. As depicted in FIG. 1, the duplicable issue detection server 110 may be configured to analyze previously created issue records stored in one or more repository servers 108 and initiate suggested issues that may be transmitted back to one or more client devices 104.

In one example embodiment, the issue tracking system 100 is configured for use by two software development teams (that can access the issue tracking system 100 from separate client devices) supporting two separate code bases that correspond to two separate software products executable on two separate computing or processing platforms.

In one example, the issue tracking system 100 may recognize that the first software development team reports a series of issues regarding integration with a third-party database or application programming interface ("API"). The series of issues may be categorized as issues related to a "third-party integration" by the first software development team and incoming issues may be associated with a cluster or group of issue records that correspond to the first software development team.

At a later time, the second software development team may also encounter a need to integrate with the same third-party database or API and, as such, the second software development team may report an issue, categorized as an "API integration" issue, to the issue tracking system 100 having content referred to as "issue data" (e.g., title, description, summary, name of the third-party database, and so on) that is similar to one of the series of issues reported to the issue tracking system 100 by the first software development team. The issue tracking system 100 may be adapted to categorize the new issue as being related to a "third-party integration" by the second software development team and the new issue may be associated with a cluster or group of issue records that correspond to the second software development team.

In this example, the issue tracking system 100 can be configured to recognize similarity (e.g., semantic similarity) between the content of the issue reported by the second software development team and the content of one or more of the set of issues reported by the first software development team. Additionally, the issue tracking system 100 can be configured to recognize similarity between the categorization of the issues by the first and second software development teams.

In one embodiment, upon determining that the issue reported by the second software development team is substantially similar to an issue previously reported by the first software development team and, additionally, that those similar issues were categorized and/or otherwise tagged or grouped in a similar if not identical manner, the issue tracking system 100 can generate a recommendation or suggestion to the second software development team to consider adding the additional issues from the set of issues previously reported by the first software development team.

In another embodiment, the issue tracking system 100 may receive a series of issues that are associated with a first cluster or group that corresponds to the first software development team. The duplicable issue detection server 110 may, in some cases, be configured to identify one or more similar issue records that are associated with a second cluster or group that corresponds to the second software development team using a similarity criteria (e.g., similarity score and/or similarity threshold). The one or more similar issue records, in some cases, may serve as a seed issue used to suggest a subsequent issue request to the user. In this case, it is not necessary that any second cluster or group issue requests (associated with the second software development team) be entered by the user in order to receive a suggested issue or prompt from the issue tracking system 100.

In one specific illustration of the foregoing examples, the issue tracking system 100 is used to track development of two mapping applications. A first mapping application is configured for execution by a mobile device supporting the Google Android® operating system and a second mapping application is configured for execution by a mobile device supporting the Apple iOS® operating system.

In this example, one or more users associated with the software development team working on the Google Android® mapping application may report or open a series of issues in the issue tracking system 100 related to integration with a third-party point(s) of interest API. A user may, for example, submit a series of issue requests using a client device 104, which are transmitted to the host service 102 via the network 105. The Google Android® software development team in this example may categorize each of these opened issues as "third-party API" and "points of interest." The issues opened by the Google Android® software development team may include issues related to, without limitation: authentication management; data fetching; data parsing; data validation; persistence layer implementation; documentation updates; and so on. In response, the host service 102 (including the issue tracking server 106 and duplicable issue detection server 110) may associate each of the series of incoming issue requests with a cluster or group that corresponds to a classification related to the Google Android® software development team. In some cases, the series of incoming issue requests may be further clustered or grouped based on sub-classifications related to one of sub-teams, labels, epics, linked user stories, or other groupings of related issues. Based on similar categorization, inter-issue linking, and/or the sequence or succession in which these issues were opened, the issue tracking system 100 can determine that the actions taken by the Google Android® software development team constitute a pattern that can be used to suggest similar issues to a separate or distinct software development team or group.

Later, the Apple iOS® software development team may begin work to integrate the same third-party point(s) of interest API. As such, the Apple iOS® software development team may begin by opening an issue categorized as "third-party API integration," and "POI database" with a description related to authentication management.

Similar to the actions of the other software development team, one or more users associated with the Apple iOS® software development team may generate a series of issue requests using (likely a different) client device 104. In response to the Apple iOS® software development team requesting to open an issue related to authentication management, the issue tracking system 100 can compare that issue to other issues previously received by the issue tracking system 100. In this example, the issue tracking system 100 may determine that the authentication management issue opened by the Apple iOS® software development team is substantially similar to (e.g., satisfies a similarity criteria using similar terms and language, similar phrases, and so on) to an authentication management issue opened by the Google Android® software development team referenced above. In addition, either prior to, contemporaneously with, or after the preceding, the issue tracking system 100 may determine that the issue categorization of "third-party API integration" used by the Apple iOS® software development team is substantially similar to the "third-party API" issue categorization used by the Google Android® software development team. Similarly, either prior to, contemporaneously with, or after the preceding, the issue tracking system 100 may determine that the issue categorization of "POI database" used by the Apple iOS® software development team is substantially similar to the "points of interest" issue categorization used by the Google Android® software development team.

In response to the foregoing determinations that the Apple iOS® software development team is opening issues that are substantially similar in both content and categorization to issues previously opened by the Google Android® software development team, the issue tracking system 100 can suggest to the Apple iOS® software development team to duplicate the other related issues already opened by the Google Android® software development team which as noted above may include, but may not be limited to, issues related to: data fetching; data parsing; data validation; persistence layer implementation; documentation updates; and so on. By way of example, the issue tracking system 100 may identify one or more seed issue records that are associated with a group or cluster related to the Google Android® software development team that also satisfy a similarity score with an issue record associated with a group or cluster related to the Apple iOS® software development team. Using the seed issue record, the issue tracking system 100 may suggest an issue request to the members of the Apple iOS® software development team to initiate the creation of a new relevant issue. In examples in which multiple seed issues are identified (a "set" of seed issues,) the set of identified seed issues can be ranked by similarity score. Thereafter, one or more of the seed issues in the ranked set of seed issues can be used by the issue tracking system 100 to suggest one or more issue requests to the members of the Apple iOS® software development team to initiate the creation of one or more new relevant issues. In some cases, only a single seed issue can be selected from the ranked set of seed issues, although this may not be required. In other examples, multiple seed issues can be used. In still further examples, different numbers of seed issues can be selected from a set of ranked seed issues and shown to a particular user of the issue tracking system 100; a user known to regularly accept recommendations of the issue tracking system 100 can be shown a higher number of issue request suggestions than a user known to typically reject recommendations of the issue tracking system.

In further examples, the issue tracking system 100 can modify the issues previously opened by the Google Android® software development team with content, phrasing, vocabulary, tagging, and/or taxonomy specific to, or otherwise associated with, the Apple iOS® software development team. For example, the issue tracking system 100 may substitute the categorization of "points of interest" used by the Google Android® software development team for "POI" as used by the Apple iOS® software development team. Similarly, the issue tracking system 100 may replace occurrences of terms in a description of an issue opened by the Google Android® software development team with terms specific to the Apple iOS® software development team (e.g., replacing occurrences of "JAVA" with "Swift," replacing occurrences of "Android" with "iOS," and so on).

In another illustration of the preceding example, the Apple iOS® software development team and the Google Android® software development team may actively pursue integration with the third-party point(s) of interest API at substantially the same time. In these examples, issues opened by the Apple iOS® software development team may be suggested to, and modified to suit, the Google Android® software development team and, additionally, issues opened by the Google Android® software development team may be suggested to, and modified to suit, the Apple iOS® software development team. In this manner, a comprehensive set of issues related to a particular task (e.g., having similar categorizations across different projects) can be reported to the issue tracking system 100, by both teams, in a substantially more time and resource efficient manner. In other words, because each development team spends less time reporting issues to the issue tracking system 100, more development work can take place.

In still further embodiments, the issue tracking system 100 can be configured to determine similarity between issues—and/or patterns in the opening or reporting of issues—based on other information in place of, or in addition to, the categorization of one or more issues. For example, the issue tracking system 100 may determine a pattern that issues assigned to a particular developer on the Apple iOS® software development team generally correspond to issues assigned to another developer on the Google Android® software development team. In these examples, the issue tracking system 100 can be configured to recommend issues to the Google Android® software development team in response to the Apple iOS® software development team opening an issue assigned to the particular developer, or vice versa.

In still further embodiments, the issue tracking system 100 can be configured to determine similarity between issues based on other information in place of, or in addition to, the examples presented above. For example, the issue tracking system 100 may determine a pattern that issues opened by a particular manager on the Apple iOS® software development team generally corresponds to issues opened by a particular manager or user on the Google Android® software development team. In these examples, the issue tracking system 100 can be configured to recommend issues to the Google Android® software development team in response to the manager of the Apple iOS® software development team opening an issue, or vice versa. For example, in one implementation, a first issue request (that is associated with a first cluster or project) is entered followed by a second issue request (that is associated with a second cluster or project). If the issue tracking system 100 receives a series of issue requests that alternate between two respective clusters or projects, the issue tracking system may infer a suggested or seed issue record or issue content that corresponds to the pattern if issue requests being entered. While a pattern of alternating entries is provided as one example, other patterns of issue request entries may also be used.

In still further embodiments, the issue tracking system 100 can be configured to determine similarity between issues based on other information in place of, or in addition to, the examples presented above. For example, the issue tracking system 100 may determine a pattern that all issues following an issue opened with a particular priority or label by the Apple iOS® software development team are generally also opened, in time, by the Google Android® software development team. In these examples, the issue tracking system 100 can be configured to maintain a queue of issues opened by the Apple iOS® software development team, each of which may be suggested to the Google Android® software development team.

In still further embodiments, the issue tracking system 100 can be configured to determine similarity between issues based on other information in place of, or in addition to, the examples presented above. For example, the issue tracking system 100 may be communicably coupled to another issue tracking system 100, managed or controlled by a third party (e.g., a separate entity). In this example, the two issue tracking system can be configured to securely exchange information to determine patterns in issue reporting between different projects in different issue reporting systems managed by different entities. For example, a development team using the first issue tracking system 100 to integrate a third-party API may enter a series of issues that can then be used by the second issue tracking system 100 to suggest to a second development team issues to open related to integration of the same third-party API. In these examples, information can be exchanged between the issue reporting systems anonymously or in a redacted form to maintain privacy and/or information security of the respective entities in control of each issue reporting system.

It may be appreciated that more generally and broadly, the issue tracking system 100—such as described herein, whether configured for use by a software development team or in any other manner to support any other workflow—can be configured to leverage, utilize, or employ any suitable pattern recognition or classification algorithm, probabilistic model, machine learning technique (whether trained or untrained), artificial intelligence method, or any suitable combination thereof, to detect, define, determine, or otherwise infer one or more patterns in, and/or logical or causal relationships between, different issues, successions or sequences of issues, or groups of issues reported to the issue tracking system 100 for particular or specified projects.

The issue tracking system 100 may be configured to detect, define, determine, or otherwise infer one or more patterns in, without limitation: a history or log of issues reported to the system for a particular project or epic and/or categorized or grouped in a particular manner; the time between reports of different issues having similar categorization; text content of one or more issues reported to the system; issues reported by or assigned to a particular user of the system; issues related to a particular task or story associated with a particular project tracked by the system; and the like.

It may be appreciated, however, that the foregoing examples are not exhaustive and that any suitable means of determining a pattern or other logical or causal link between two or more issues can be used. For simplicity of description, these operations are described herein as operations to detect a pattern in, or apply machine learning to, issues previously reported to the issue tracking system 100 in a particular project and/or having a particular categorization or grouping. The system can leverage any detected patterns in issue reporting in particular projects or having particular categorizations to, among other actions, suggest and/or autonomously duplicate (with or without modification) issues in other projects or for the benefit of other users of the same or a different issue reporting system.

In one general example, upon detecting a pattern that a first issue is opened prior to a second issue in the same project, the issue tracking system 100 may define (e.g., create an entry in a database) a causal relationship or other association between the first issue and the second issue. The causal relationship may be related to a dependency between the issue records or may be determined or learned from prior activity. In one example, the issue tracking system 100 may use a history of existing issue records to identify reoccurring sequences or groupings of issue records that may indicate a causal relationship.

As a result of this determined or defined causal relationship, when a user submits an issue request to open a new issue that is determined, by the issue tracking system 100, to be substantially similar to the first issue of this example, the issue tracking system 100 may anticipate or predict that the user also intends to—or would otherwise be advised to—open another issue substantially similar to the second issue of this example. In response, the issue tracking system 100 can generate a suggestion and display or otherwise transmit that suggestion to a user of the issue reporting system to open another issue having properties and contents substantially similar to the second issue of the preceding example.

In these example embodiments, the issue tracking system 100 can be configured to leverage any suitable similarity or classification algorithm, probabilistic model, machine learning technique (whether trained or untrained), or artificial intelligence method, or any suitable combination thereof, to compare issues to one another to determine similarities therebetween. Examples include, but are not limited to: determining cosine distance or similarity of content of two or more issues; determining Jaccard similarity of content of two or more issues; determining Euclidean or Manhattan distance between content of two or more issues; determining semantic similarity of text content of two or more issues; and the like.

Example content of an issue (e.g., issue request and/or issue record) that can be compared in the course of determining whether two issues are similar can include, but may not be limited to: issue description; issue summary; project name; issue type; a name or identity of a user who reported the issue; a name or identity of a user assigned to the issue; a priority of the issue; one or more labels, tags, or categories of the issue; one or more linked issues; one or more epic links; one or more user story links; and the like.

In one example, the issue tracking system 100 can be configured to perform a semantic similarity comparison of description content of two separate issues (e.g., two issue requests and/or issue records) to estimate a likelihood that those issues are related. More specifically, a semantic similarity comparison can generate a score or value from two or more input corpuses (e.g., description content of two or more separate issues) that corresponds to a statistical confidence that the two or more input corpuses describe, or relate to, the same concept or content. Thereafter, the score or value can be compared to a threshold (which may be fixed or may vary from embodiment to embodiment or from comparison to comparison) to determine whether the compared issues should be considered similar by the issue tracking system 100.

It may be appreciated that these foregoing examples are not exhaustive and that any suitable means of comparing two or more issues reported by one or more users can be used. For simplicity of description, these operations are described herein as operations to "determine a similarity between" issues reported to the issue tracking system 100.

In one specific illustration of the preceding examples, the issue tracking system 100 can determine a pattern that an issue related to updating documentation for a software development project is often opened after an issue related to adding a feature to that software development project is opened. Upon making such a determination, the issue tracking system 100 can define a causal relationship between opening an issue related to adding a feature to a software development project and opening an issue related to updating documentation for that software development project.

In this manner, and as a result of the defined causal relationship between reported issues, an issue related to adding a feature to a software development project reported by a user can trigger the issue tracking system 100 to anticipate or otherwise predict that the same user also intends to—or would otherwise be advised to—open another issue related to updating documentation for that software development project. Upon making such a determination, the issue tracking system 100 can provide a suggestion to that user to provide input to open a software documentation update issue.

In some embodiments, as noted above, the issue tracking system 100 can also prepopulate content of a suggested issue based on content or data of one or more previously reported issues. In this manner, as a user provides one or more issue reports to the issue tracking system 100, one or more suggestions of additional issues, which may already include relevant and/or prepopulated data or content, can be presented to that user for consideration.

Additionally, as noted above, the issue tracking system 100 can be configured to leverage one or more detected patterns across multiple discrete projects tracked by the same issue tracking system 100.

For example, as noted above, the issue tracking system 100 can be configured for use by multiple software development teams each supporting different software projects. In this example, a first software development team supporting a first software project may request the issue tracking system 100 to open a series of issues related to a feature of the first software project.

As noted with respect to other embodiments described herein, the issue tracking system 100 may infer that each of these issues are related, or otherwise associated, with one another, based, at least in part, on the observation that these issues were opened in the same projects, with the same or similar categorization(s), in rapid succession.

Later, a second software development team supporting a second software project may request the issue tracking system 100 to open an issue related to a feature of the second software product that the issue tracking system 100 determines is substantially similar to one of the issues opened by the first software development team. Based on this determination, the issue tracking system 100 may generate a suggestion to the second software development team to open additional issues having properties and contents substantially similar to the issues opened by the first software development team.

Additionally, the issue tracking system 100 can be configured to provide suggestions of issues to be opened only if certain conditions are satisfied. For example, the issue tracking system 100 may be configured to suggest issues to be opened only if a similarity metric, score, or estimation exceeds a threshold or a particular value. In some cases, the threshold may be dynamically adjusted based on feedback received from the user or other users. For example, if one or more users have previously accepted an issue suggested by the issue tracking system, a dynamic threshold may be lowered in response. In some cases, the issue tracking system 100 may be configured to withhold suggestions if only one suggested issue could be provided. Alternatively, the issue tracking system 100 may be configured to withhold suggestions if the system determines that a high number of issues are potentially related.

Additionally, the issue tracking system 100—such as described herein—can be triggered to detect patterns in issue reporting by a variety of stimuli including, for example, a series of user inputs that may include multiple issue requests. For example, in some embodiments, the issue tracking system 100 initiates an operation to detect a pattern in issue reporting in response new issue being reported to a particular project. In other cases, the issue tracking system 100 initiates an operation to detect a pattern in issue reporting each time (e.g., in response to) a new issue is reported with a particular tag, categorization, title, or other specified content. In other cases, the issue tracking system 100 initiates an operation to detect a pattern in issue reporting each time a new issue is reported with a particular tag, categorization, title, or other specified content. In still other examples, the issue tracking system 100 initiates an operation to detect a pattern in issue reporting in response to direct input from a user. In still other examples, the issue tracking system 100 initiates an operation to detect a pattern in issue reporting at a regular interval (e.g., every fifteen minutes, every hour, every day, every week, and so on); any suitable interval may be used.

Additionally, the issue tracking system 100 can be triggered to determine whether one or more suggestions can be made based on a previously detected pattern of issue reporting in response to a variety of stimuli. For example, in some embodiments, the issue tracking system 100 initiates an operation to detect whether one or more suggestions can be made in response to a new issue being reported to a particular project. In other cases, the issue tracking system 100 initiates an operation to detect whether one or more suggestions can be made each time (e.g., in response to) a new issue is reported with a particular tag, categorization, title, or other specified content. In other cases, the issue tracking system 100 initiates an operation to detect whether one or more suggestions can be made each time a new issue is reported with a particular tag, categorization, title, or other specified content. In still other examples, the issue tracking system 100 initiates an operation to detect whether one or more suggestions can be made in response to direct input from a user. In still other examples, the issue tracking system 100 initiates an operation to detect whether one or more suggestions can be made at a regular interval (e.g., every fifteen minutes, every hour, every day, every week, and so on); any suitable interval may be used.

As noted above, in the illustrated embodiment, the host service 102 includes one or more purpose-configured modules or components each configured to perform a discrete task associated with the operation of the issue tracking system 100. In particular, the host service 102 includes an issue tracking server 106, a repository server 108, and a duplicable issue detection server 110. It may be appreciated that although these functional elements are identified as separate and distinct "servers" that each include allocations of physical or virtual resources (identified in the figure as the resource allocations 106*a*, 108*a*, and 110*a*, respectively)—such as one or more processors, memory, and/or communication modules (e.g., network connections and the like)—that such an implementation is not required. More generally, it may be appreciated that the various functions described herein of a host service 102 can be performed by any suitable physical hardware, virtual machine, containerized machine, or any combination thereof.

The issue tracking server 106 of the host service 102 can be configured to manage and maintain a record of issues reported in one or more projects tracked by the issue tracking system 100. In addition, the issue tracking server 106 of the host service 102 can be configured to communicably couple to the client device 104 via the network 105 in order to exchange information with and/or receive input(s) from the client device 104 in the course of tracking and/or documenting progress of completion of one or more issues of one or more projects tracked by the issue tracking system 100.

Information or data related to projects tracked by the issue tracking system 100, such as a codebase of a software development project, can be stored, in many embodiments, in a database managed by the repository server 108, which can be communicably and securely coupled to the issue tracking server 106. The repository server 108 may be used to store or maintain a repository of issue records, issue record groups, issue record clusters, and/or other data related to the creation and maintenance of issues. The database(s) managed by the repository server 108 can be implemented with any suitable known or later developed database or digital information storage technology or technique. In many examples, the repository server 108 is configured to track and maintain a record of changes made to data or information stored in the database(s) managed by the repository server 108, but this may not be required.

In many examples, the issue tracking server 106 can be configured to receive, over the network 105, from the client device 104 (e.g., via user input provided through a graphical user interface rendered on the display 104*c*, provided by the client application, or any combination thereof), an issue request. The issue request may include, by way of example, a request to open, create, or report an issue in a particular project; a request to modify an existing issue; a request to close an existing issue; a request to link an existing issue to another issue; a request to assign an issue to a particular user; a request to initiate an operation to detect one or more patterns of issue reporting (such as described herein); a request to initiate an operation to determine whether two or more issues are related; and the like. In some examples, in response to information or requests received from the client device 104, the issue tracking server 106 can submit a request to the repository server 108 to add, modify, or delete data stored in one or more databases managed by the repository server 108.

In addition, the client device 104—and in particular, the client application executed by the client device 104—can be configured to receive, over the network 105, from the issue tracking server 106, without limitation: a suggestion of an issue to be opened in a particular project; a notification that one or more suggestions of issues to be opened are available for consideration; a request to provide information related to a particular issue; a request to confirm whether two issues, projects, or categorizations of issues are related or equivalent; and so on.

It may be appreciated that the foregoing examples are not exhaustive; more generally and broadly, it is appreciated the issue tracking server 106, the repository server 108, and the client device 104 can transact any suitable data or information, in any suitable form or format, across one or more communication channels or protocols, in a secure or encrypted manner, or in an unencrypted manner, and so on.

The duplicable issue detection server 110 of the host service 102 can be communicably coupled to one or both of the issue tracking server 106 and the repository server 108. The duplicable issue detection server 110 can be configured to access information stored by or otherwise accessible to either or both the issue tracking server 106 and the repository server 108 in order to, among other operations, detect one or more patterns of issue reporting.

For example, the duplicable issue detection server 110 can be configured to submit a request to the issue tracking server 106 for all issues reported to that server that match a particular query. For example, the duplicable issue detection server 110 may query issue tracking server 106 to return all issues reported in a particular project that include at least one of a set of categorizations, tags, or groupings. In response to such a request, the issue tracking server 106 can return to the duplicable issue detection server 110 all issues that match the query.

Thereafter, the duplicable issue detection server 110 can perform one or more operations to detect, define, determine, or otherwise infer one or more patterns in, and/or logical or causal relationships between, the set of issues returned by the issue tracking server 106. As noted above, the duplicable issue detection server 110 can leverage a number of suitable techniques to detect any pattern that may emerge from a set of issues received from the issue tracking server 106.

In some cases, the duplicable issue detection server 110 may determine that a pattern of issue reporting exists by grouping the set of issues received from the issue tracking server 106 based on nearness in time in which the issues were reported. For example, if two or more issues are reported in rapid sequence, the duplicable issue detection server 110 may infer that those issues are causally or otherwise logically related to one another.

In other cases, the duplicable issue detection server 110 may determine that a pattern exists by grouping the set of issues based on the user assigned to those issues. For example, if two or more issues are assigned to the same user, the duplicable issue detection server 110 may infer that those issues are causally or otherwise logically related to one another.

It may be appreciated the foregoing examples are not exhaustive; any number of suitable patterns may be extracted or inferred from the set of issues received from the issue tracking server 106. Additionally, it may be appreciated that the duplicable issue detection server 110 can utilize any number of suitable techniques to identify signals of such patterns. Examples include, but may not be limited to, techniques including or leveraging: classification algorithms; supervised learning algorithms; probabilistic classification algorithms; Bayesian analysis algorithms; support vector machines; neural networks; deep-learning algorithms; decision trees; natural language processing algorithms; hierarchies of experts; Kalman filters; entropy-based models; and the like.

In some cases, the duplicable issue detection server 110 can be further configured to perform one or more preprocessing operations prior to initiating an operation to attempt to detect a pattern of issue reporting. Example preprocessing operations can include or leverage, but may not be limited to: averaging; normalizing; synonym finding; semantic root-finding; linguistic tagging; tokenization; term substitution; term frequency; and so on.

In many cases, the duplicable issue detection server 110 is further configured to determine similarity between issues reported in different projects (e.g., in order to determine, in one example, whether a previously detected pattern of issue reporting can be leveraged to provide one or more suggestions of additional issues). As noted with respect to other embodiments described herein, the duplicable issue detection server 110 can be configured to leverage any suitable similarity or classification algorithm, probabilistic model, machine learning technique (whether trained or untrained), or artificial intelligence method, or any suitable combination thereof, to compare issues to one another to determine similarities therebetween. Examples include, but are not limited to: determining cosine distance or similarity of content of two or more issues; determining Jaccard similarity of content of two or more issues; determining Euclidean or Manhattan distance between content of two or more issues; determining semantic similarity of text content of two or more issues; and the like. Example content of an issue that can be compared in the course of determining whether two issues are similar can include, but may not be limited to: issue description; issue summary; project name; issue type; a name or identity of a user who reported the issue; a name or identity of a user assigned to the issue; a priority of the issue; one or more labels, tags, or categories of the issue; one or more linked issues; one or more epic links; one or more user story links; and the like.

In a similar manner, the duplicable issue detection server 110 can be configured to detect similarity between different categorizations, tags, or groupings of issues between different projects tracked by the issue tracking system 100.

In view of these foregoing examples, it may be appreciated that the duplicable issue detection server 110 of the issue tracking system 100 can be configured to (1) detect patterns in issue reporting for any specified project and/or categorization of issue tracked by the issue tracking system 100 and (2) determine similarity between issues and issue categorizations. With such information, the duplicable issue detection server 110 can be leveraged by the issue tracking system 100 to provide one or more recommendations of issues to open.

In one specific illustration of such an operation, a user of the client device 104 can operate a graphical user interface rendered by the client application via the display 104c to request that the host service 102 open an issue in a particular project tracked by the issue tracking system 100. The request from the user can include detailed content describing the requested issue, including among other content, a description of the issue, a project in which the issue should be added, and a categorization of the issue.

In response to the request, the issue tracking server 106 of the host service 102 can record the issue in a database (not shown). In addition, the issue tracking server 106 can submit a request to the duplicable issue detection server 110 to determine whether the issue opened by the user is similar to any issue previously reported in the same project or in a different project.

In response to the request from the issue tracking server 106, the duplicable issue detection server 110 may iteratively compare the newly reported issue to all or a subset of previously reported issues. In some examples, the duplicable issue detection server 110 may submit a query (or more than one query) to the issue tracking server 106 for a set of previously reported issues to which the newly received issue can be compared.

In many cases, the duplicable issue detection server 110 is configured to generate a similarity score (e.g., a statistical confidence) when comparing the newly reported issue to a previously reported issue. Typically, the duplicable issue detection server 110 is configured to ignore or discard any previously reported issue associated with a similarity score that does not crosses or otherwise satisfies a predetermined threshold. For example, the duplicable issue detection server 110 may be configured to discard any previously reported issue that is determined to be fifty percent similar to the newly received issue. In other cases, the duplicable issue detection server 110 may be configured to discard any previously reported issue that is determined to be at most ninety percent similar to the newly received issue. It may be appreciated that any suitable threshold can be selected. In some cases, the threshold may vary or may depend upon a particular project, issue categorization, user setting, or the like. Optionally, the duplicable issue detection server 110 can rank one or more previously reported issues based on the similarity score.

Once the duplicable issue detection server 110 has identified one or more previously reported issues associated with a similarity score sufficient to infer that the newly-received issue and the previously reported issue are directed to the same concept or matter, the duplicable issue detection server 110 can determine whether the previously reported issue is associated with a pattern of issue reporting. For example, it may be determinable that the previously reported issue is associated with a series or set of other issue reports. In other cases, it may be determinable that the previously reported issue is associated with closure or modification of another issue or set of issues. In other cases, it may be determinable that the previously reported issue is associated with assignment or reassignment of a particular issue or task to a particular individual. These examples are not exhaustive.

Once the duplicable issue detection server 110 has identified that one or more previously reported issues is associated with a pattern of issue reporting, the duplicable issue detection server 110 can communicate to the client device 104 (either directly or via the issue tracking server 104) recommendations of one or more actions to take. Example actions, as noted with respect to other embodiments described herein can include, but may not be limited to: submitting one or more supplemental or additional issues; considering modification of one or more issues; considering renaming one or more issues; and so on.

In some examples, the duplicable issue detection server 110 may be configured to provide customized suggestions to the user of the client device 104. For example, as noted above, the duplicable issue detection server 110 can be configured to modify one or more suggestions provided to the user based on the content of the newly reported issue. In one example, suggestions for new issues can include information extracted, derived, or otherwise originating from the project associated with the newly received issue, despite that the previously reported issue found to be similar to the newly received issue may have originated from another project.

The foregoing embodiment depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2A:
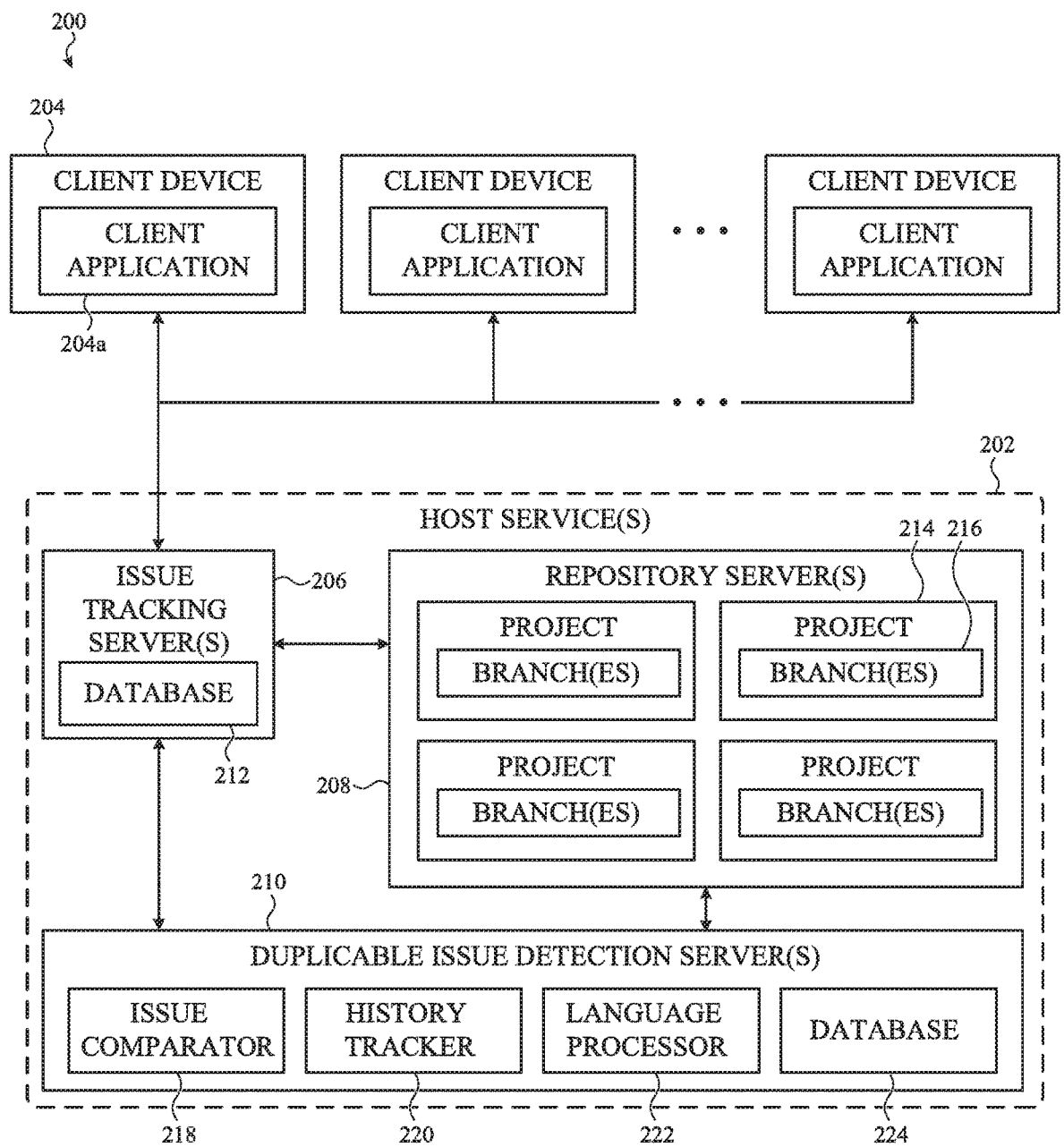
FIG. 2A is a system and signal flow diagram of an issue tracking system, such as described herein.

For example, FIG. 2A, depicts a system and signal flow diagram of an issue tracking system, such as described herein. The issue tracking system 200 can be configured, both physically and operationally, in the same manner as the issue tracking system 100 described in reference to FIG. 1 and this description is not repeated.

The issue tracking system 200 can include a host service 202 (also referred to herein as a host system) that is configured to communicate with one or more client devices, one of which is identified as the client device 204. As with other embodiments described herein, the client device 204 can be configured to execute a client application 204a that is configured to transact information and data with the host service 202. The client application 204a provides a graphical user interface to facilitate interaction between the issue tracking system 200 and a user of that system.

The host service 202 includes an issue tracking server 206 that is communicably coupled to a repository server 208 and a duplicable issue detection server 210. As with other embodiments described herein, the issue tracking server 206 can include a database 212 that is configured to store information related to issues reported and closed for projects tracked by the issue tracking system 200. Similarly, as noted above, the repository server 208 can be configured to store information or data related to one or more projects tracked by the issue tracking system 200. For example, in one such case, the issue tracking system 200 is configured for use by a software development team. In this example, the repository server 208 can include a version-controlled database that maintains a codebase for a project 214. The project 214 can include one or more branches 216, each of which may be associated with one or more issues tracked and/or stored by the database 212 of the issue tracking server 206.

As with other embodiments described herein, the host service 202 also includes the duplicable issue detection server 210. In the illustrated embodiment, the duplicable issue detection server 210 can include a number of discrete subservices or purpose-configured modules, containers, or virtual machines each configured to perform, coordinate, serve, or otherwise provide one or more services, functions, or operations of the duplicable issue detection server 210. More particularly, the duplicable issue detection server 210 can include an issue comparator 218, an issue history tracker 220, a language processor 222, and a database 224.

The issue comparator 218 of the duplicable issue detection server 210 can be configured in any suitable manner to implement the operation of comparing one or more issues for similarity. As noted above, this operation can be performed in a number of ways. An example method by which two issues can be compared includes comparing the text content of each issue to one another. For example, issue descriptions can be compared using any suitable text comparison technique.

The issue history tracker 220 of the duplicable issue detection server 210 can be configured in any suitable manner to implement or otherwise perform the operation of inferring issue reporting patterns. More specifically, in one example, the issue history tracker 220 can be configured to monitor and/or analyze the time and sequence in which various associated issues (e.g., issues in the same project, issues having the same categorization, and so on) were reported.

The language processor 222 of the duplicable issue detection server 210 can be configured in any suitable manner to implement or otherwise perform the operation of providing natural language processing and/or analysis of content of one or more issues. In one example, the language processor 222 can be leveraged by the issue comparator 218 to compare the text content of two or more issues. In another example, the language processor 222 can be leveraged by the issue history tracker 220 in the course of determining or detecting one or more patterns of issue reporting. It may be appreciated that the language processor 222 may be suitably configured for purpose-agnostic natural language processing and/or text or string comparisons.

The database 224 of the duplicable issue detection server 210 can be configured in any suitable manner to implement or otherwise perform the operation of recording one or more detected patterns of issue reporting. The database 224 can be accessed by any module or component of the duplicable issue detection server 210 at any suitable time to determine whether a particular issue matches and/or otherwise corresponds to a previously detected pattern of issue reporting.

It may be appreciated that the foregoing simplified examples are not exhaustive of the various possible components, systems, servers, and/or modules that may be used by an issue tracking system, such as described herein. Accordingly, more generally and broadly, it may be appreciated that an issue tracking system such as described herein can be configured to receive an issue report from a user, compare those issue reports to previously-detected issue reports or issue reporting patterns, and provide recommendations of additional actions that can be taken by the user based on a determined similarity between the newly-received issue report and one or more previously reported issue reports or one or more previously-detected issue reporting patterns.

Figure 2B:
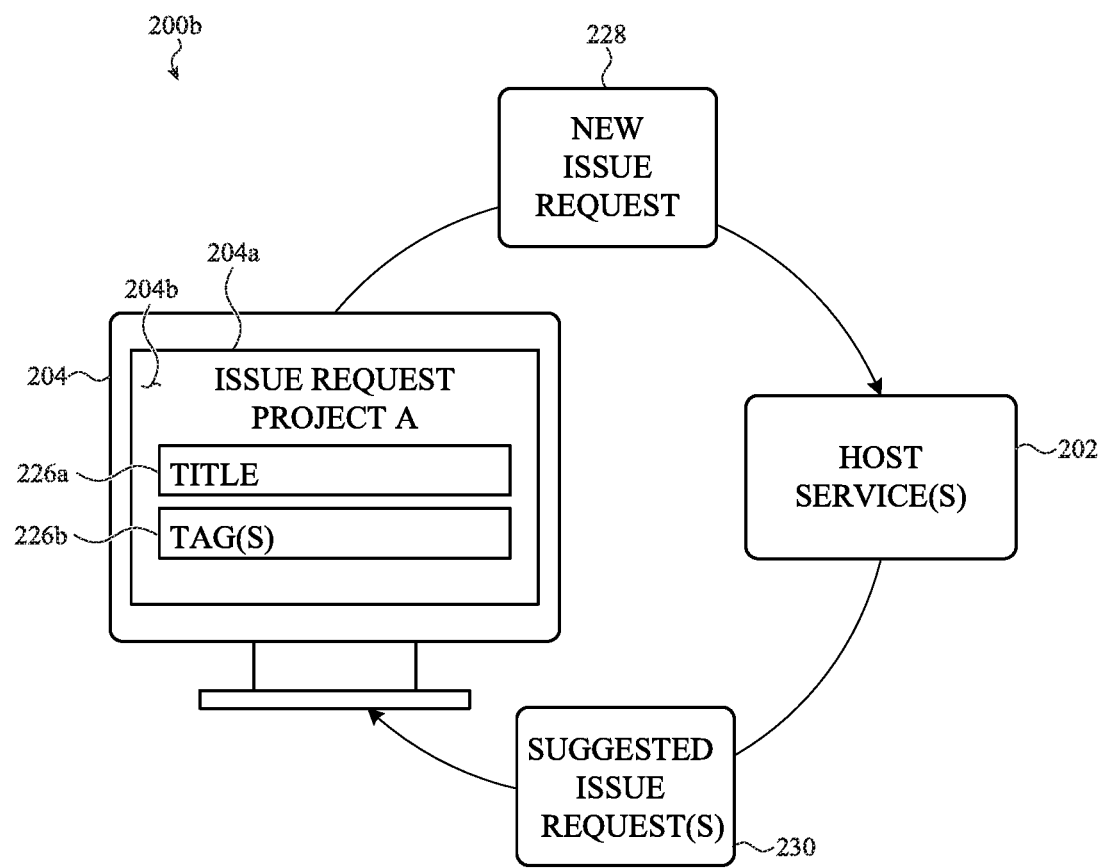
FIG. 2B is a signal flow diagram of an issue tracking system suggesting an issue, such as described herein.

For example FIG. 2B depicts an example signal flow diagram depicting communications between a client application operating on a client device and a host service of an issue tracking system, such as described herein. More specifically, as with the embodiment depicted in FIG. 2A, the issue tracking system 200b includes a host service 202 in communication with a client device 204. The client device 204 can execute an instance of a client application 204a. The client application 204a can render a graphical user interface 204b. The graphical user interface 204b can be used by a user to submit one or more issue requests (and/or to generate one or more issue reports) to the host service 202. More specifically, the graphical user interface 204b can render one or more data entry fields, such as the data entry fields 226a, 226b illustrated in the figure that can receive data entered by a user.

In one specific implementation of this example embodiment, a user can operate the graphical user interface 204b of the client application 204a to enter data into either or both of the data entry fields 226a, 226b to generate an issue request 228 for a specific project tracked by the issue tracking system 200b that can be submitted to the host service 202. In response to receiving the issue request 228, the host service 202—or, more precisely, a duplicable issue detection server or service of the host service 202 (see, e.g., FIG. 2A)—can perform one or more operations. For example, the host service 202 can determine a grouping and/or categorization of the issue request 228 based on, without limitation: a title of the issue request 228 (e.g., keywords, semantic content, lemmatized content); a description of the issue request 228; a tag or group identifier of the issue request 228; and so on.

Thereafter, the host service 202 can compare the grouping (whether specified by the user or determined autonomously by the host service 202) of the issue request 228 to other issues having related groupings in other projects. These groupings may not be identical and may be related in any suitable manner. For example, a grouping of issues in a first project related to a directory feature of a software product may be determined to be related to a grouping of issues in a second project related to a client list feature of a second software product. In another example, a first group maintaining a first software project may refer to a first grouping of issues related to a rendering feature as "rendering" issues whereas another group maintaining a second software project using the same rendering feature may refer to groups of issues related to that feature as "raytracing" issues. In these embodiments, the host service 202 can be configured to establish a logical or causal link between differently named or differently categorized groups in different projects. The host service 202 can leverage any suitable autonomous or assisted technique to establish logical or causal links between groups (also referred to as clusters), such as described herein.

In response to determining a group (or more than one group) of the issue request 228, and in response to determining or obtaining a set of issues (e.g., records, reports, requests, and so on) associated with other groups that may be related to the group(s) associated with the issue request 228, the host service 202 can compare the issue request 228 to each issue of the set of issues. Example methods of comparing the issue request 228 to other issues—which may be in another group and/or in another project—include but are not limited to: semantic comparison; document similarity comparison; text similarity comparison; and so on.

In response to determining one or more issues in one or more other (related) groups, the host service 202 can inform the client device 204 and, in particular, the client application 204a executed by the client device 204 that one or more other issues 230 (also referred to herein as issue templates or issue seeds) may be relevant to the project associated with the issue request 228. More simply, the host service 202 can suggest to the user of the client device 204 that the user enter additional issues.

For example, in one embodiment, a user of the issue tracking system 200b may be a Google Android® developer working on a project related to a game application. In this example, the user may submit the issue request 228 to document a bug reported to that user that relates to a third-party API.

The host service 202 can ingest the issue request 228 and may group the issue request 228 into a bug report group, a group related to the third-party API, a Google Android® group, a group associated with the game project implementation on Google Android®, among others. The assignment of the issue request 228 to the various groups may be performed automatically or with the assistance of the user or a third-party service. In many cases, the operation of assigning the issue request 228 to one or more groups is based, at least in part, on content of the issue request 228 supplied in whole or in part by the user of the client device. Example content of the issue request 228 that may be used for grouping can include, but may not be limited to: issue title; issue summary; issue tags; project; and so on.

Once the issue request 228 is associated with one or more groups or clusters, the host service 202 (also referred to herein as a host service) can determine whether these groups are related to other groups. For example, it may be determined that a group or cluster associated with the game projection implementation on Google Android® is associated with another group or cluster associated with the game project implementation on Apple iOS®. Upon making this determination, the host system 202 can select from the issue records recorded in the Apple iOS® project only those issues that are members of a group or cluster related to the same third-party API referenced above.

Thereafter, once one or more issues from the Apple iOS® project that relate to the third-party API, are known to the host system 202, the host system 202 can compare each to the issue request 228.

In one example, the host system 202 can determine that a previously entered issue in the Apple iOS® project uses similar language and/or phrasing to describe a bug in that project as used by the user in the issue report 228. In response to this determination, the host system 202 can determine whether any other issues were reported in the Apple iOS® project that were related to the identified Apple iOS® bug report that exhibits similarity to the issue report 228.

In one example, the host system 202 can determine that three additional issue reports or records are related to the identified issue record. In response to this determination, the host system 202 can recommend to the user, via sending a signal to the client application 204a, that the user enter additional issues in the Google Android® project.

Figure 3:
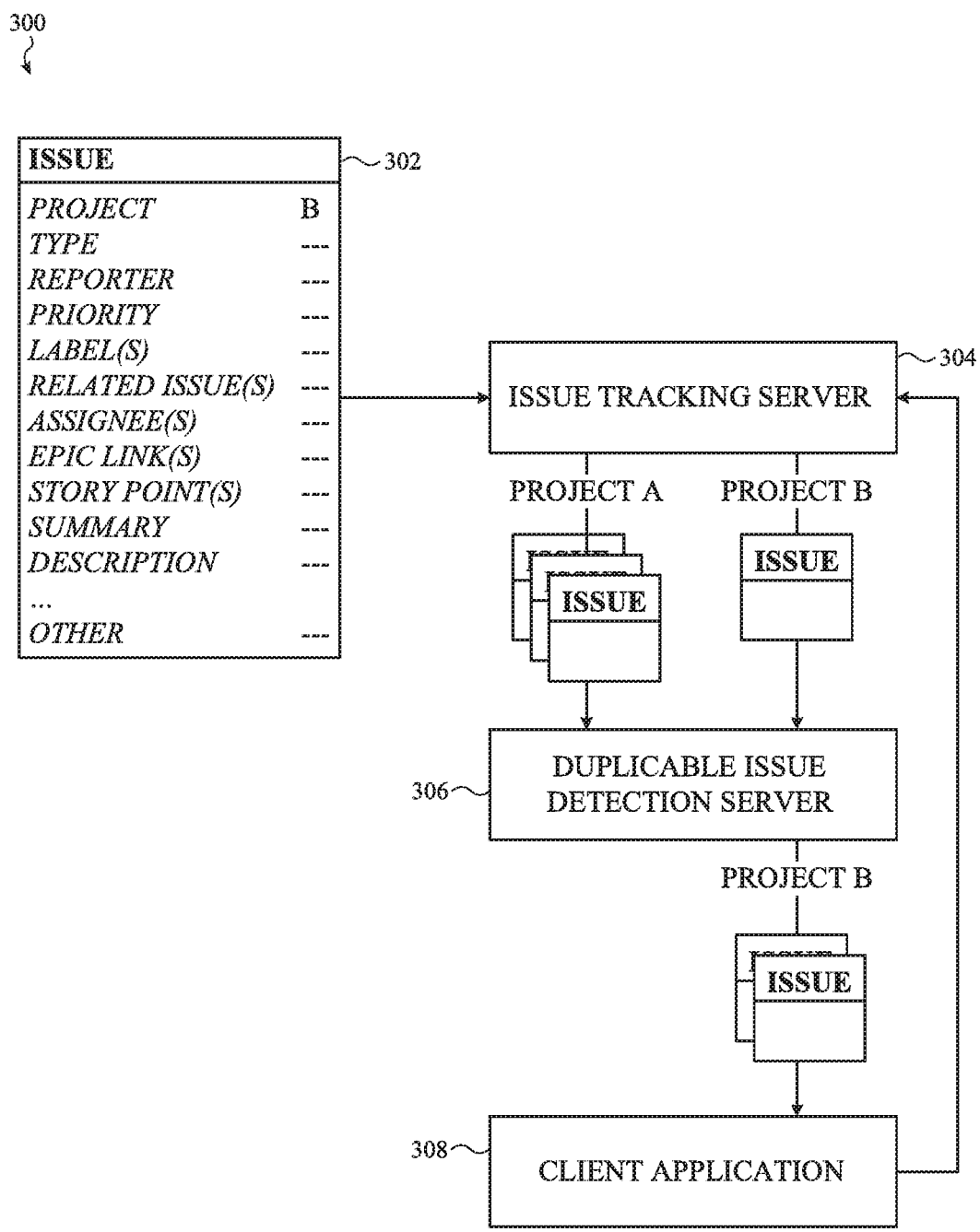
FIG. 3 is a signal flow diagram of a duplicable issue detection server of an issue tracking system, such as described herein.

It may be appreciated that the foregoing specific example is not exhaustive. Other embodiments may operate in a different manner. For example, FIG. 3 depicts a signal flow diagram corresponding to the operation of a duplicable issue detection server of an issue tracking system 300, such as described herein. More specifically, the issue tracking system 300 can be configured to receive an issue request 302 from a user. For purposes of the examples described herein, an issue request 302 may also be referred to as an issue report, a report, and also simply a request. The issue request 302 may be interpreted by the issue tracking system 300 as a request to initiate, modify, or edit an issue (e.g., an issue record) being tracked by the issue tracking system 300. For purposes of the following example, the issue request 302 is directed to a request to initiate a new issue to be tracked by the issue tracking system 300. The issue request 302 can include content such as, but not limited to: a project name or identity (e.g., Project B); an issue type; a name or identity of a user reporting the issue; one or more categorizations or labels associated with the issue; and so on. The issue request 302 can be received by an issue tracking server 304. The issue tracking server 304 can be configured in the same manner as other issue tracking servers, such as described herein (see, e.g., FIGS. 1-2A), and this description is not repeated.

As noted with respect to other embodiments described herein, the issue tracking server 304 can be communicably coupled to a duplicable issue detection server 306, which in turn can receive from the issue tracking server 304 information related to issues reported to the issue tracking server 304 for multiple projects. For example, in the illustrated example embodiment, the issue tracking server 304 can communicate to the duplicable issue detection server 306 the issue reporting history of two separate projects, identified as Project A and Project B.

In this example embodiment, the duplicable issue detection server 306 can be configured to compare the issue request 302, which is associated with a cluster of records designated as Project B, to previously reported issue requests, such as those associated with a cluster of records designated as Project A. In the illustrated example, Project A is associated with three previously reported issues, one of which may be determined by the duplicable issue detection server 306 to be similar to the issue request 302. As a result of this determination, the duplicable issue detection server 306 can recommend that the other two issues previously reported in Project A also be reported in Project B. More specifically, the duplicable issue detection server 306 can send a signal to a client application 308 operated by the user suggesting two additional issues be reported. In response, the user can operate the client application 308 (e.g., interact with a graphical user interface of the client application 308) to report the suggested issues to the issue tracking server 304.

The foregoing embodiments depicted in FIGS. 1-3 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, although many embodiments reference a duplicable issue detection server configured to compare issues between different projects, this may not be required. For example, a duplicable issue detection server may be configured to determine patterns of issue reporting within a single project. In other cases, a duplicable issue detection server can be configured to determine whether a newly reported issue's categorization is substantially similar to a previously reported issue report prior to determining whether the newly reported issue is similar to any previously reported issue. In other cases, this may not be required.

Generally and broadly, FIGS. 4-8 depict flow charts corresponding to example simplified methods of operating a system, such as described herein, to profile and/or monitor power consumption in a virtual computing environment.

Figure 4:
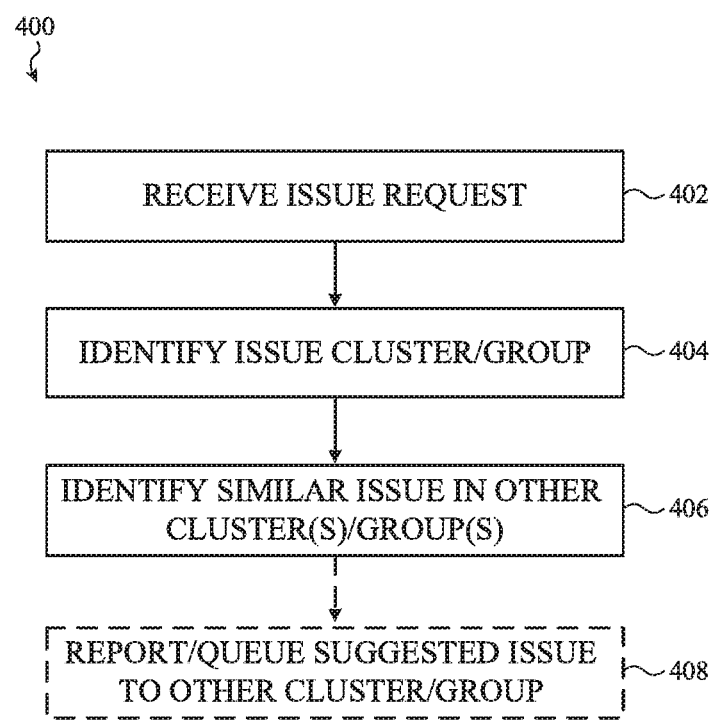
FIG. 4 is a flow chart that depicts example operations of a method of detecting duplicable issues in an issue tracking system, such as described herein.

FIG. 4 is a flow chart that depicts example operations of a method of detecting duplicable issues in an issue tracking system, such as described herein. The method 400 can be performed by any hardware or software, whether virtual or otherwise, such as described herein. In one example, the method 400 is performed, in whole or in part, by a duplicable issue detection server, such as described above.

The method 400 includes operation 402 in which an issue request is received. As noted with respect to embodiments described herein, an issue request can be any suitable request and may take a number of forms and formats. In one embodiment, an issue request can take the form of a web-based form filled out by a user of an issue tracking system, such as described herein. The web-based form can include any suitable number of fields, data entry points, or other information. In other examples, the issue request can take the form of a formatted (e.g., JavaScript object notation or extensible markup language and the like) file transmitted from a client device or a client application to a host service, such as described above in reference to FIG. 1. Regardless of form or format, it may be appreciated that an issue request can include any number of suitable data or information relating to the issue to be opened by the issue tracking system. Examples include, but are not limited to: an issue title; an issue description; an issue summary; an issue assignee; an issue reporter; an issue type; an issue category, cluster, or group; an indication of a projection to which the issue belongs; and so on. In some cases, the issue request may be complete meaning that all possible data fields that can comprise an issue request are populated. In other cases, the issue request may be partially complete, including only certain data.

Once the issue request is submitted by a user, client application, or client device, the method continues at operation 404 in which a grouping, clustering, or categorization of that issue request is determined. In these examples, as described above, the grouping, clustering, or categorization of an issue request can take a number of suitable forms. For example, if the issue request relates to an Apple iOS® project, the issue request may be clustered or grouped into a group or cluster of issues all related to Apple iOS®. Similarly, if the issue request relates to a particular third-party API, the issue request may be clustered or grouped into a group or cluster of issues all related to the third-party API, regardless which project any particular issue is associated with. More specifically, it may be appreciated that in these examples, an issue (e.g., an issue request and/or issue record) can be classified, grouped, or clustered according to any suitable number of criteria; such criteria may not be limited to issues reported under the umbrella of a single project, epic, or user story. For example, for an issue request related to integration of a third-party API for the benefit of a mapping application for an Apple iOS® project, that issue request may be added to a number of groups including, but not limited to: a group of Apple iOS® project issues; a group of mobile software issues; a group of third-party integration related issues; a group of mapping-related issues; a group of issues related to the specific third-party API issues; a group of issues related to third-party API integration generally; a group of issues related to a particular team member or developer; and so on. It may be appreciated that the issue request of operation 402 can be grouped, clustered, or otherwise associated with a number of groups that may relate to the issue request's content, project, issue type, reporter, assignee, and so on.

The method 400 also includes operation 406, in which other issues having a similar content, but different categorizations (e.g., different project, different category, and so on), can be determined. For example, the method may determine that the issue request received at operation 402 is grouped and/or clustered in a similar manner to a previously reported issue in an unrelated project (e.g., Google Android® compared against Apple iOS®). In another example, the method may determine that the issue request exhibits a high semantic similarity or document similarity to another issue having entirely different groupings or clusters. For example, a similarity score may be determined against all other issues—regardless or in view of groupings of those issues—tracked by the issue tracking system. Thereafter, the most related issues to the issue reported at operation 402 can be sorted or otherwise ranked in order to determine which of those issues are most similar to the issue request of operation 402.

Finally, optionally, at operation 408, one or more additional issues can be suggested based on the other issues determined at operation 406. For example, the method may determine to suggest two or more of the issues determined to be related (whether by similar grouping, cluster, or whether by similar content, or both). In some embodiments, only a single suggestion may be made.

Figure 5:
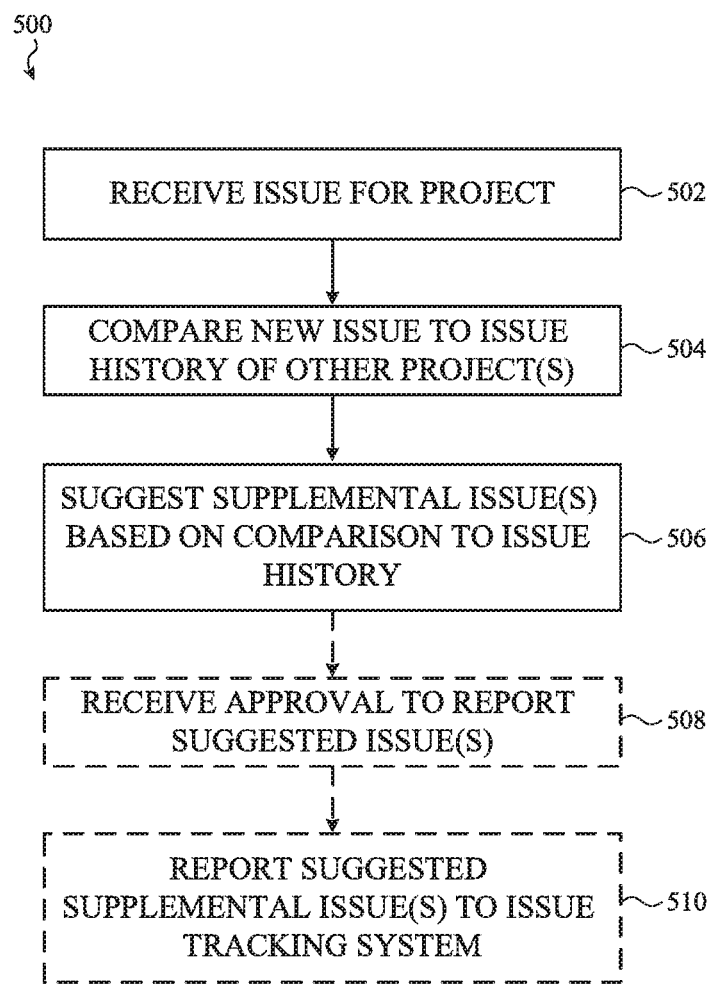
FIG. 5 is a flow chart that depicts example operations of another method of detecting duplicable issues in an issue tracking system, such as described herein.

FIG. 5 is a flow chart that depicts example operations of another method of detecting duplicable issues in an issue tracking system, such as described herein. As with the method 400, the method 500 can be performed by any hardware or software, whether virtual or otherwise, such as described herein. In one example, the method 500 is performed, in whole or in part, by a duplicable issue detection server, such as described above.

The method 500 includes operation 502 in which an issue request or issue report is received related to a particular project tracked by an issue tracking system. As noted above with respect to operation 402 of method 400, the issue request received at operation 502 can take a number of suitable forms and formats and may include or reference any suitable content. It may be appreciated that the description provided above with reference to operation 402 of method 400 of FIG. 4 may be likewise applied to operation 502 of method 500; this description is not repeated. However, in contrast to operation 402 of method 400, the issue request of operation 502 of method 500 may include a specific reference to a project to which the issue should be assigned.

Next, at operation 504, the newly received issue can be compared to one or more previously received issues that may be associated with a different project tracked by the issue tracking system. As noted above with respect to the method 400 of FIG. 4, the newly received issue can be compared to one or more other issues reported in different projects in any suitable manner. Examples include but are not limited to: determining a document similarity between content of issues of different projects; determining semantic similarity between a selected field of different issues in different projects; determining that a cluster or group of issues associated with one project is related to a cluster or group of issues associated with the project of the newly-reported issue and comparing issues within that cluster or group to the newly-reported issue; and so on.

Next, at operation 506, one or more additional or supplemental issue requests can be determined based, at least in part, on the result of operation 504. More specifically, one or more issues found to be similar in content and/or grouping—regardless of project—can be suggested. In some cases, these suggestions can be ranked according to a particular ranking score. Examples include, but are not limited to: ranking by frequency at which an issue request is reported; connection depth between one or more issues; semantic similarity between issues; document similarity between issues; and so on or any combination thereof.

Next, optionally, at operation 508, approval can be received from a user of the issue tracking system to add the supplemental issue requests suggested at operation 506. Finally, at operation 510, the approved issues can be added to the issue tracking system.

Figure 6:
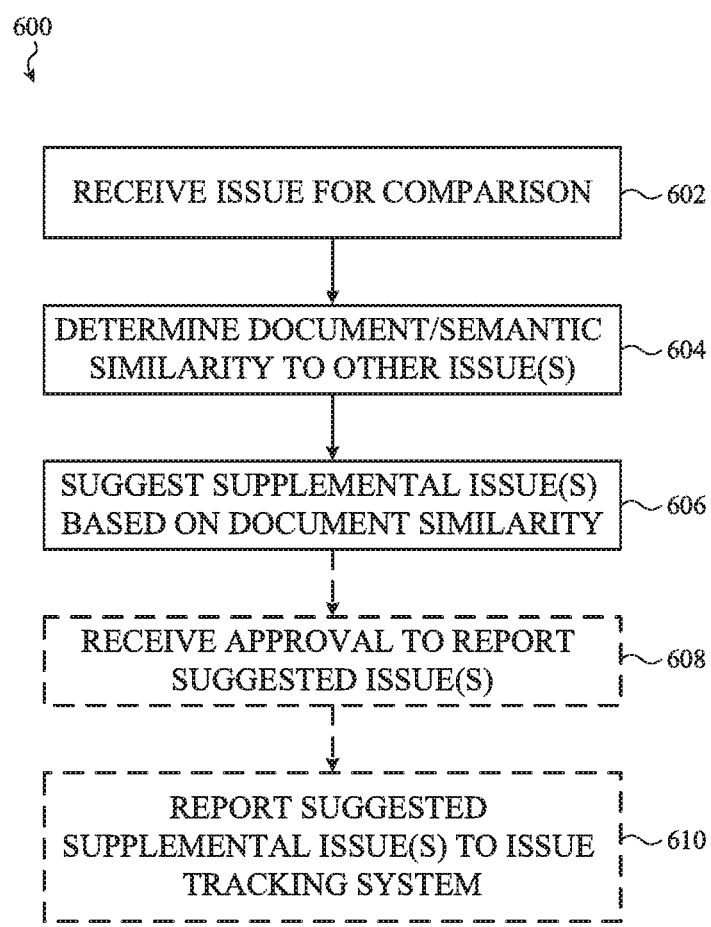
FIG. 6 is a flow chart that depicts example operations of a method of determining similarity between issues (e.g., whether an issue can be duplicated) in an issue tracking system, such as described herein.

FIG. 6 is a flow chart that depicts example operations of a method of determining similarity between issues in an issue tracking system, such as described herein. As with other methods described herein, the method 600 can be performed in whole or in part by a physical or virtual machine, such as described herein.

The method 600 includes operation 602 in which an issue is received for comparison to one or more other issues. As noted above, the issues to which the received issues is compared can be obtained from any suitable source or combination of sources. For example, these issues to which the received issue can be compared can be obtained from, without limitation: a database of all issues tracked by the issue tracking system; all issues tracked by a second issue tracking system in communication with the issue tracking system; all issues associated with a particular project; all issues associated with a particular cluster or group; all issues having particular data or content; and so on.

At operation 604, one or more similarity values can be calculated between the issue received for comparison at operation 602 and one or more other issues. Example similarities that can be determined and/or calculated can include, but are not limited to: document similarity; semantic similarity; grouping similarity; clustering similarity; project similarity; and so on.

Next, at operation 606, one or more supplemental issues can be suggested based on the similarity values calculated at operation 604. As with other embodiments described herein, these suggestions can be provided in any suitable form or format and may—in some examples—be ranked according to a particular ranking score or schema.

Next, optionally, at operation 608, approval can be received from a user of the issue tracking system to add the supplemental issue requests suggested at operation 606. Finally, at operation 610, the approved issues can be added to the issue tracking system.

Figure 7:
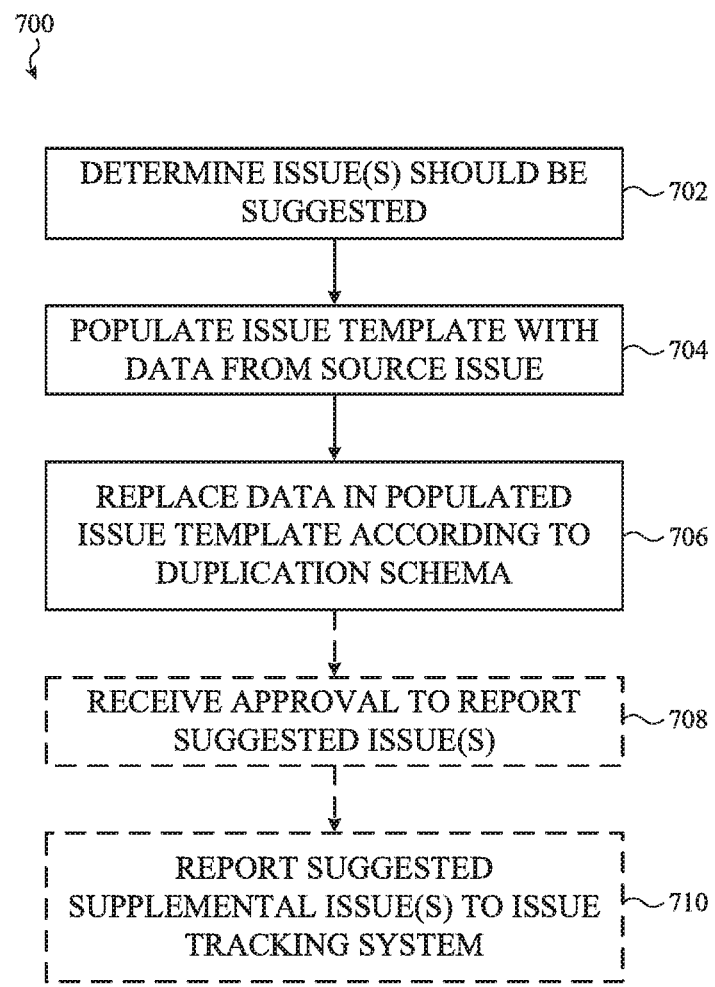
FIG. 7 is a flow chart that depicts example operations of a method of generating duplicate issues in an issue tracking system, such as described herein.

FIG. 7 is a flow chart that depicts example operations of a method of generating duplicate issues in an issue tracking system, such as described herein. The method 700 includes operation 702 in which one or more suggested issues are determined. This operation can proceed in a manner similar to other methods described herein; this description is not repeated.

Next, at operation 704, an issue template, based at least in part on the issues suggested at operation 702 can be populated with information from source data, which can include an issue request submitted by a user. For example, a description previously submitted by another use of the system can be used to populate the issue template.

Next, at operation 706, data in the populated issue request can be modified and/or otherwise tailored (e.g., according to duplication schema, setting, or other file defined by or accessible to the issue tracking system) to a particular project or group or issue classification. For example, occurrences of the tag or categorization of Google Android® may be replaced with Apple iOS®. In other examples, occurrences of the description "integration with COMPANY A API" can be replaced with "integration with COMPANY B API." These examples are not exhaustive and it may be appreciated that other manipulations of data are possible.

Next, optionally, at operation 708, approval can be received from a user of the issue tracking system to add the supplemental issue requests suggested at operation 706. Finally, at operation 710, the approved issues can be added to the issue tracking system.

Figure 8:
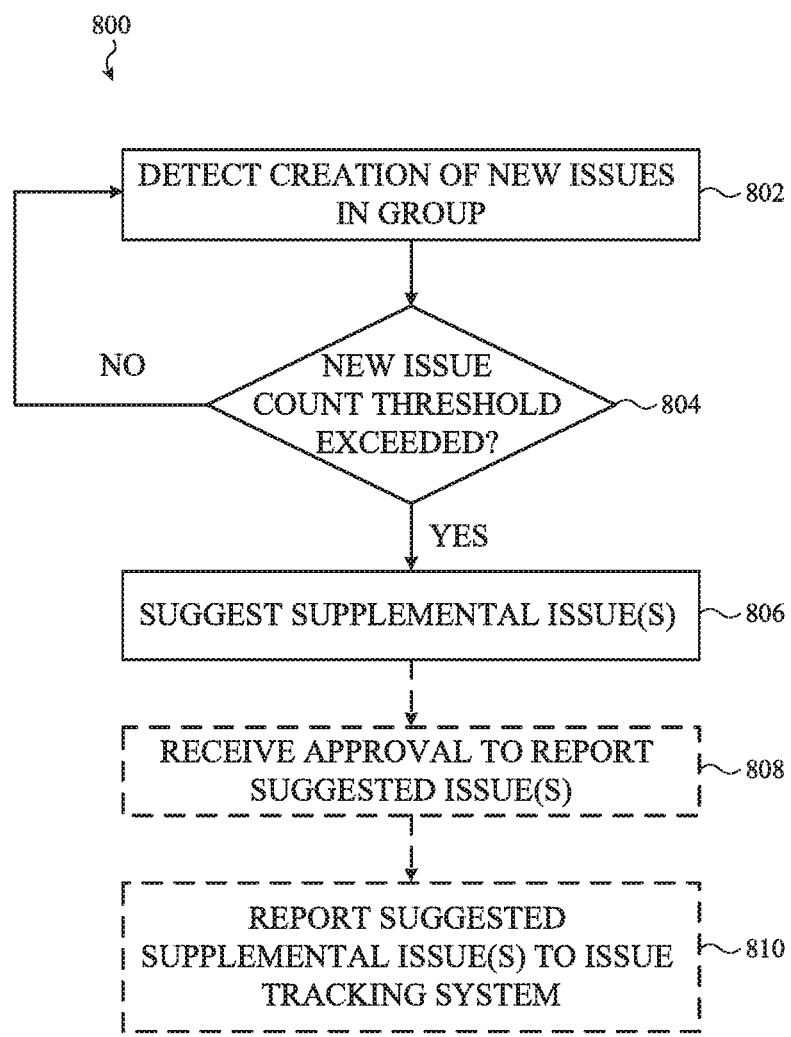
FIG. 8 is a flow chart that depicts example operations of a method of triggering suggestions of duplicate issues in an issue tracking system, such as described herein.

FIG. 8 is a flow chart that depicts example operations of a method of triggering suggestions of duplicate issues in an issue tracking system, such as described herein. The method 800 includes operation 802 in which a new issue is detected in a group of issues of a particular project. Next, at decision point 804, it may be determined whether a threshold number of new issues has been added to the group of issues identified in operation 802. The threshold can be any suitable number and may vary from embodiment to embodiment. If, at the decision point 804 it is determined that the threshold has not been crossed, the method 800 returns to operation 802. Alternatively, the method 800 advances to operation 806 in which one or more recommendations or suggestions of additional issues to be reported can be provided. Next, optionally, at operation 808, approval can be received from a user of the issue tracking system to add the supplemental issue requests suggested at operation 806. Finally, at operation 810, the approved issues can be added to the issue tracking system.

The foregoing embodiments depicted in FIGS. 4-8 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Accordingly, one may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

We claim:

1. A networked issue tracking system for suggesting and tracking issue records using a similarity score, the networked issue tracking system comprising:
a client device executing a client application; and
a host service operably coupled to the client application of the client device by a network, the host service having a processor configured to:
receive, from the client application, a first issue request;
generate a first issue record in response to receiving the first issue request;
associate the first issue record with a first issue cluster defined by the host service and based on a first similarity between first content of the first issue request and content of one or more issue records associated with the first issue cluster;

determine a similarity score between the first issue record and one or more second issue records that are associated with a second issue cluster defined by host service that is distinct from and disjoint with the first issue cluster;

identify a seed issue record from the one or more second issue records based on a determination that the similarity score of the seed issue record satisfies a similarity threshold; and transmit a suggested issue request to the client application, the suggested issue request comprising issue data extracted from the seed issue record.

2. The networked issue tracking system of claim 1, wherein:

the first issue cluster includes a first set of issue records; and the second issue cluster includes a second set of issue records that is separate and distinct from the first set of issue records.

3. The networked issue tracking system of claim 1, wherein:

the first issue cluster is associated with a first software operating system; and the second issue cluster is associated with a second software operating system that is different than the first software operating system.

4. The networked issue tracking system of claim 1, wherein:

the first issue cluster is associated with a first software development team; and the second issue cluster is associated with a second software development team that is separate and distinct from the first software development team.

5. The networked issue tracking system of claim 1, wherein:

the first content of the first issue request includes a first project description;

the content of the one or more issue records includes a project description; and the first similarity is determined by comparing the first project description of the first issue request with the project description of the one or more issue records.

6. The networked issue tracking system of claim 1, wherein:

the first similarity is determined by comparing one or more fields of the first issue request with one or more fields of the one or more issue records associated with the first issue cluster; and determining the similarity score comprises applying a similarity algorithm to the first issue record and the one or more second issue records that are associated with the second issue cluster.

7. The networked issue tracking system of claim 6, wherein applying the similarity algorithm includes one or more of:

determining a cosine distance between the first issue record and the one or more second issue records;

determining a Jaccard similarity between the first issue record and the one or more second issue records;

determining Euclidean distance between the first issue record and the one or more second issue records;

determining a Manhattan distance between the first issue record and the one or more second issue records; and determining a semantic similarity between the first issue record and the one or more second issue records.

8. The networked issue tracking system of claim 1, wherein:

the one or more issue records associated with the first issue cluster are issue records that have been generated in response to previously received issue requests; and the previously received issue requests share a common categorization or tag.

9. An issue tracking system for tracking completion of software development tasks over time, the issue tracking system comprising:

a host service comprising a processor configured to:

receive a first issue request for a first project directed to a first software platform, the first project tracked by the issue tracking system, the first issue request received from a client application in communication with the issue tracking system over a network;

determine a similarity score between a first content of the first issue request and a second content of a second issue record that was previously received for a second project tracked by the issue tracking system, the second project directed to a second platform different from the first platform;

determine that the similarity score exceeds a similarity threshold; and in response to the similarity score exceeding the threshold, transmit a suggested issue request to the client application over the network, the suggested issue request comprising a recommendation to submit a third issue request to the issue tracking system, the third issue request having suggested issue content that is based on data extracted from the second issue record.

10. The issue tracking system of claim 9, wherein:

the processor is further configured to associate the first issue request with a first cluster based on the first content of the first issue request;

the second issue record is associated with a second cluster;

the first cluster includes a first set of issue records; and the second cluster includes a second set of issue records that is separate and distinct from the first set of issue records.

11. The issue tracking system of claim 10, wherein:

the processor is further configured to receive an acceptance of the suggested issue request from the client application; and in response to receiving the acceptance, the processor is configured to modify the similarity threshold.

12. The issue tracking system of claim 10, wherein:

the similarity score is a first similarity score; and the host service is further configured to determine a second similarity score between the first cluster and the second cluster.

13. The issue tracking system of claim 10, wherein the first content of the first issue request comprises:

an issue title;

an issue description that describes a problem to be addressed;

a platform description indicating a software platform; and an issue creator.

14. The issue tracking system of claim 10, wherein determining the similarity score of the first content of the first issue request to the content of the second issue record comprises performing a semantic similarity analysis operation.

15. The issue tracking system of claim 14, wherein the semantic similarity analysis operation comprises comparing a description of the first issue request to a description of the second issue record.

16. A computer-implemented method of operating an issue tracking system on a host service that is in communication with multiple client devices over a computer network, the computer-implemented method comprising:
receiving a first issue request from a client device of the multiple client devices;
associating a first project associated with a first platform with the first issue request by analyzing content of the first issue request;
determining a similarity score between first content of the first issue request for the first project tracked by the issue tracking system and stored content for each of a set of previously received issue requests for a second project tracked by the issue tracking system, the second project associated with a second platform different from the first platform;
selecting a seed issue record associated with one or more of the set of previously received issue requests based on a determination that the seed issue record has a respective similarity score that satisfies a similarity threshold; and
sending a signal to a client application on the client device, the signal comprising a recommendation to submit a supplemental issue request to the issue tracking system, the supplemental issue request comprising suggested content extracted from the seed issue record.

17. The computer-implemented method of claim 16, wherein determining the respective similarity score between the first issue request and the seed issue record comprises comparing a first issue type of the first issue request to a second issue type of the seed issue record.

18. The computer-implemented method of claim 16, wherein determining the respective similarity score between the first issue request and the seed issue record comprises performing a document similarity operation between text of the first issue request and the seed issue record.

19. The computer-implemented method of claim 16, further comprising modifying content of the seed issue record based on the first content of the first issue request.

20. The computer-implemented method of claim 19, wherein modifying content of the seed issue record based on the first content of the first issue request comprises replacing a second tag of the seed issue record with a first tag of the first issue request.

* * * * *